(12) United States Patent
Zivney

(10) Patent No.: US 8,078,188 B2
(45) Date of Patent: Dec. 13, 2011

(54) USER SELECTABLE AUDIO MIXING

(75) Inventor: Matthew Zivney, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 822 days.

(21) Appl. No.: 11/623,696

(22) Filed: Jan. 16, 2007

(65) Prior Publication Data

US 2008/0170703 A1    Jul. 17, 2008

(51) Int. Cl.
*H04W 68/00*    (2009.01)

(52) U.S. Cl. ............... 455/456; 455/90.1; 455/414.1; 455/418; 455/550.1; 455/556.2; 455/567; 379/157; 379/177; 379/210.01; 379/211.01

(58) Field of Classification Search ............ 455/414.1, 455/418, 458, 550.1, 556.2, 567, 90.1; 379/157, 379/177, 210, 211
See application file for complete search history.

(56) References Cited

U.S. PATENT DOCUMENTS

| | | | | |
|---|---|---|---|---|
| 6,011,851 | A * | 1/2000 | Connor et al. | 381/17 |
| 6,954,652 | B1 | 10/2005 | Sakanashi | |
| 7,308,325 | B2 * | 12/2007 | Coles et al. | 700/94 |
| 7,505,601 | B1 * | 3/2009 | Brungart | 381/309 |
| 7,555,354 | B2 * | 6/2009 | Walsh et al. | 700/94 |
| 2002/0045438 | A1 * | 4/2002 | Tagawa et al. | 455/412 |
| 2005/0190932 | A1 * | 9/2005 | Woo et al. | 381/119 |

FOREIGN PATENT DOCUMENTS

| | | |
|---|---|---|
| JP | 04010743 A | 1/1992 |
| JP | 2000197199 A | 7/2000 |
| JP | 2000299718 A | 10/2000 |
| JP | 2001177609 A | 6/2001 |
| JP | 2006174198 A | 6/2006 |
| JP | 2006254064 A | 9/2006 |
| KR | 20040024453 A | 3/2004 |
| KR | 20050094052 A | 9/2005 |
| WO | 2004068822 | 8/2004 |

OTHER PUBLICATIONS

International Search Report, PCT/US08/051234, International Search Authority, European Patent Office, May 21, 2008.
Written Opinion, PCT/US08/051234, International Search Authority, European Patent Office, May 21, 2008.

* cited by examiner

*Primary Examiner* — Steve D Agosta
(74) *Attorney, Agent, or Firm* — Timothy F. Loomis; Espartaco Diaz Hidalgo

(57) ABSTRACT

This disclosure describes audio mixing techniques that allow a user to select between two different audio signals for output in a perceptual foreground of a combined output. As an example, the two different signals may comprise a music audio and a phone call audio. In this case, the music audio and phone call audio may be initially combined such that the phone call is delivered in the perceptual foreground and the music audio is delivered in a perceptual background. However, a user is able to switch the music to the foreground and the phone call to the background by actuating a user input device. In this way, after receiving a telephone call, if a user wants to move the phone call into a perceptual background in favor of music in the foreground, the user is able to achieve this result, e.g., at the press of a button.

21 Claims, 3 Drawing Sheets

USER SELECTABLE AUDIO MIXING

TECHNICAL FIELD

This disclosure relates to audio processing and, more particularly, audio techniques that combine two or more audio signals to create a combined audio output signal.

BACKGROUND

The terms "audio" and "audio signal" are used herein to refer to any of a wide variety of audio signals or sources such as music, speech, tones, alerts, and the like. Audio signals refer to analog or digital signals. For digital audio, data compression may be used via audio coding. There are many audio coding standards that facilitate the coding of digital audio. Examples include standards defined by the motion pictures expert group (MPEG), Musical Instrument Digital Interface (MIDI) standards, windows media audio (WMA) standards, and standards by Dolby Laboratories, Inc. Moreover, many audio coding standards continue to emerge, including the digital MP3 standard and successors to the MP3 standard, such as the advanced audio coding (AAC) standard used in "iPod" devices sold by Apple Computer, Inc.

Many different types of devices can deliver audio to users. Examples of such audio devices include music players, wireless mobile devices, wireless communication devices, such as radio telephones, direct two-way communication devices (sometimes called walkie-talkies), desktop and laptop computers, workstations, satellite radio devices, intercom devices, radio broadcasting devices, synthesizer devices, onboard computers used in automobiles, watercraft and aircraft, and a wide variety of other devices.

In many situations, two or more audio signals (which may be analog or digital signals) are processed simultaneously by a given audio device. In the case of radio telephones that also provide digital music capabilities, for example, the music output may conflict with the audio associated with an incoming telephone call, e.g., making it difficult for the user to concentrate on the incoming phone call. To address this conflict, conventionally, an incoming telephone call may preempt any music output. In this case, the music may be muted when an incoming telephone call is received.

SUMMARY

In general, this disclosure describes audio mixing techniques that allow a user to select between phone call audio and secondary audio for output in a perceptual foreground of a combined output. The secondary audio may comprise any of a wide variety of audio unrelated to the phone call audio, such as music, an audio book or recorded radio show, a news broadcast, an audio stock market ticker, audio associated with a video presentation, a workout recording, or the like. The secondary audio may be delivered in a perceptual foreground until a phone call is received.

Upon reception of a phone call, the secondary audio and phone call audio are initially combined such that the phone call is delivered in the perceptual foreground and the secondary audio is delivered in a perceptual background. After that, however, a user is able to switch the secondary to the foreground and the phone call to the background by actuating a user input device. In this way, after receiving a telephone call, if a user wants to move the phone call into a perceptual background in favor of music or other secondary audio in the foreground, the user is able to achieve this result, e.g., at the press of a button.

The techniques may be particularly useful when a user is placed on "hold" in a telephone conversation, in which case the user may want to hear his or her music or other secondary audio in the foreground while waiting on hold. When the call comes off of hold, the user may then manually switch back to delivery of the phone call in the perceptual foreground and delivery of the secondary audio in the perceptual background.

In one aspect, this disclosure provides a method comprising receiving first audio and second audio, generating first combined audio in which the first audio is in a perceptual foreground and the second audio is in a perceptual background, receiving user input to switch the first combined audio, and in response to the user input, generating a second combined audio in which the second audio is in the perceptual foreground and the first audio is in the perceptual background.

In another aspect, this disclosure provides a method comprising outputting music audio to a user at a wireless device, receiving telephone call audio at the wireless device, generating a first combination of the music audio and the telephone call audio in response to receiving the telephone call audio, wherein the first combination is such that the telephone call audio is in a perceptual foreground and the music audio is in a perceptual background, outputting the first combination to the user, receiving input from the user to switch from the first combination to a second combination, in response to the user input, generating the second combination of the music audio and the telephone call audio, wherein the second combination is such that the telephone call audio is in the perceptual background and the music audio is in the perceptual foreground, and outputting the second combination to the user.

In another aspect, this disclosure provides a device comprising an audio mixing unit that receives first audio and second audio, and generates first combined audio in which the first audio is in a perceptual foreground and the second audio is in a perceptual background, a user input element that receives user input, and a control unit that causes, in response to the user input, the audio mixing unit to generate a second combined audio in which the second audio is in the perceptual foreground and the first audio is in the perceptual background.

In another aspect, this disclosure provides a wireless device configured to output music audio to a user at the wireless device, receive telephone call audio at the wireless device, generate a first combination of the music audio and the telephone call audio in response to receiving the telephone call audio, wherein the first combination is such that the telephone call audio is in a perceptual foreground and the music audio is in a perceptual background, output the first combination to the user, receive input from the user to change from the first combination to a second combination, in response to the user input, generate the second combination of the music audio and the telephone call audio, wherein the second combination is such that the telephone call audio is in the perceptual background and the music audio is in the perceptual foreground, and output the second combination to the user.

In another aspect, this disclosure provides a computer readable medium comprising instructions that upon execution cause a wireless device to receive first audio and second audio, generate first combined audio in which the first audio is in a perceptual foreground and the second audio is in a perceptual background, receive user input to switch the first combined audio, and in response to the user input, generate a second combined audio in which the second audio is in the perceptual foreground and the first audio is in the perceptual background.

In another aspect, this disclosure provides a computer readable medium comprising instructions that upon execution cause a wireless device to output music audio to a user at a wireless device, receive telephone call audio at the wireless device, generate a first combination of the music audio and the telephone call audio in response to receiving the telephone call audio, wherein the first combination is such that the telephone call audio is in a perceptual foreground and the music audio is in a perceptual background, output the first combination to the user, receive input from the user to switch from the first combination to a second combination, in response to the user input, generate the second combination of the music audio and the telephone call audio, wherein the second combination is such that the telephone call audio is in the perceptual background and the music audio is in the perceptual foreground, and output the second combination to the user.

In another aspect, this disclosure provides an apparatus comprising means for receiving first audio and second audio, means for generating first combined audio in which the first audio is in a perceptual foreground and the second audio is in a perceptual background, means for receiving user input to switch the first combined audio, and means for generating a second combined audio in response to the user input, in which the second audio is in the perceptual foreground and the first audio is in the perceptual background.

In another aspect, this disclosure provides an apparatus comprising means for outputting music audio to a user at a wireless device, means for receiving telephone call audio at the wireless device, means for generating a first combination of the music audio and the telephone call audio in response to receiving the telephone call audio, wherein the first combination is such that the telephone call audio is in a perceptual foreground and the music audio is in a perceptual background, means for outputting the first combination to the user, means for receiving input from the user to switch from the first combination to a second combination, means for generating the second combination of the music audio and the telephone call audio in response to the user input, wherein the second combination is such that the telephone call audio is in the perceptual background and the music audio is in the perceptual foreground, and means for outputting the second combination to the user.

Additional details of various embodiments are set forth in the accompanying drawings and the description below. Other features, objects and advantages will become apparent from the description and drawings, and from the claims.

DETAILED DESCRIPTION

Figure 1:
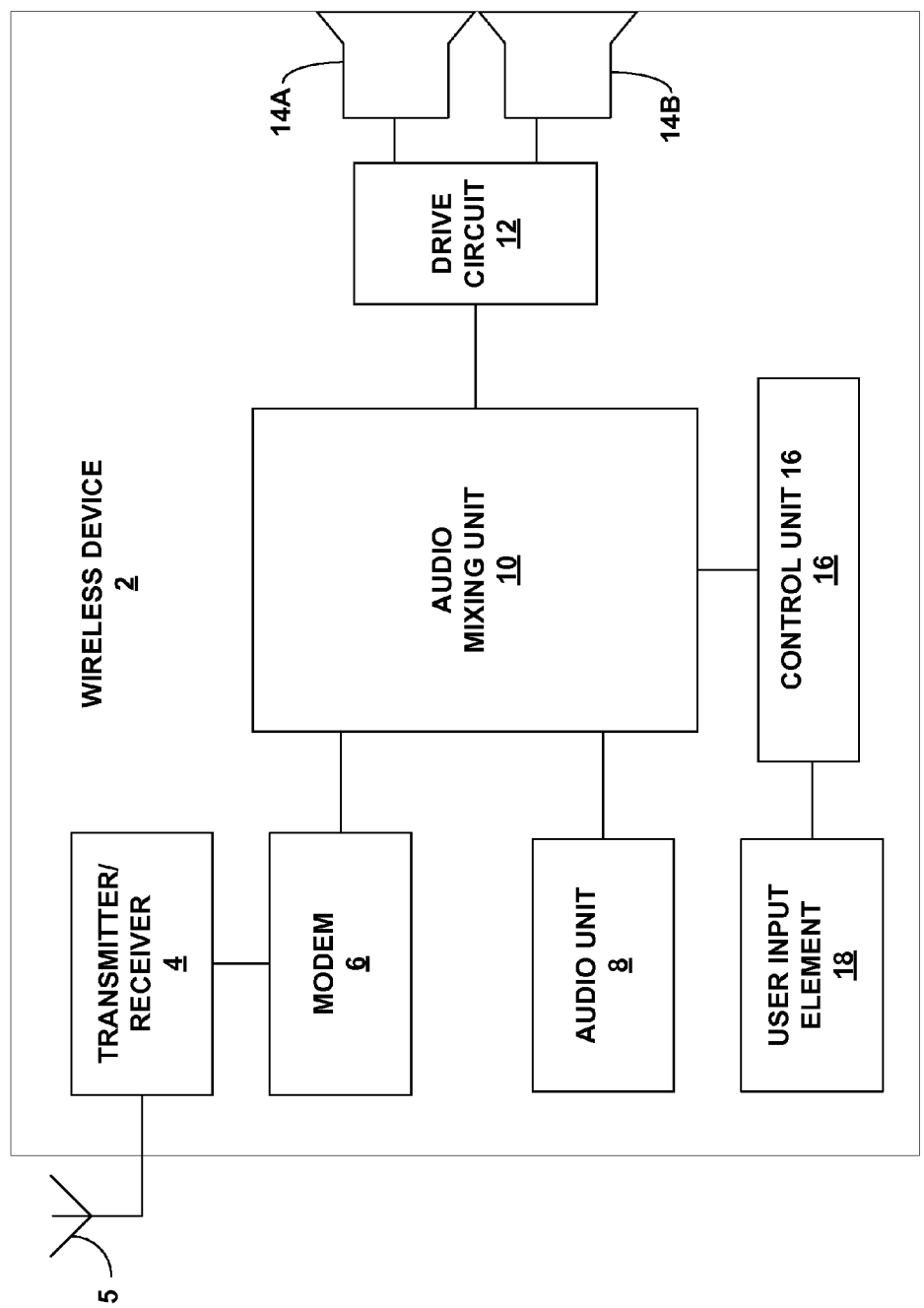
FIG. 1 is a block diagram of an exemplary audio device that can implement the techniques of this disclosure.

This disclosure describes audio mixing techniques that allow a user to select between phone call audio and a secondary audio for output in a perceptual foreground. The secondary audio may comprise any of a wide variety of audio unrelated to the phone call audio, such as music, an audio book or recorded radio show, a news broadcast, an audio stock market ticker, audio associated with a video presentation, a workout recording, or the like. The secondary audio can be delivered to a user in a perceptual foreground until a phone call is received. Upon reception of a phone call, the secondary audio and phone call audio are automatically combined such that the phone call is delivered in the perceptual foreground and the secondary audio is moved to the perceptual background.

At this point, a user is able to switch the secondary audio to the foreground and the phone call to the background by actuating a user input device. In this way, after receiving a telephone call, if a user wants to move the phone call into a perceptual background in favor of music or other secondary audio in the foreground, the user is able to achieve this result, e.g., at the press of a button.

The techniques of this disclosure may be particularly useful when a user is placed on "hold" in a telephone conversation, in which case, the user may want to hear his or her music in the foreground while waiting on hold. The techniques may also be used during a conversation, e.g., if the user is disinterested in the conversation and prefers to listen to music or other secondary audio during the conversation. In any case, the techniques provide control to the user to decide whether to move the phone call audio to the perceptual background in favor of secondary audio in the foreground. The user may be able to toggle the secondary and phone call from the foreground to the background at the user's discretion. For example, when a user comes off hold in a telephone conversation, the user may toggle back to the setting that has the phone call audio in the foreground. Auto detection of the user coming off hold is also contemplated, wherein the device automatically changes back to the default settings when the user is taken off hold. In most cases, however, the user may prefer to manually control any audio changes following reception of a telephone call.

Any of a wide variety of user actuation techniques may be used to facilitate the switch of secondary audio from the perceptual background to the perceptual foreground. The user, for example, may press a button, touch a keypad or touch screen, actuate a hard key or soft key, select from an options menu, use voice activated commands, apply some other actuation technique or apply combinations of these or other actuation techniques. In accordance with this disclosure, a telephone device such as a wireless handset can be programmed to default settings in which the secondary audio is moved to a perceptual background upon reception of a telephone call. However, upon user actuation of an input element on the device, the secondary audio is moved to the perceptual foreground and the telephone call is moved to the perceptual background.

FIG. 1 is a block diagram of an exemplary wireless device 2 that can implement the techniques of this disclosure. The illustrated components of wireless device 2 are only those needed to describe the techniques of this disclosure. Wireless device 2 may include many other components, such as a general purpose processor, a display, filters or other signal processing elements, and wide variety of other components. The other components of device 2 would typically depend on the type of device being designed. Indeed, even some of the illustrated components are optional and not necessarily needed in order for a device to implement the techniques of this disclosure.

Exemplary wireless device 2 may comprise a wireless radiotelephone, such as a so-called cell phone. To this end, wireless device 2 may include a transmitter/receiver 4 and a modulator/demodulator "modem" 6. Transmitter/receiver 4 sends and receives wireless signals via antenna 5. Modem 6 demodulates received wireless signals, and generates an audio signal, i.e., phone call audio associated with an incoming telephone call. FIG. 1 is merely exemplary, as the techniques of this disclosure might also apply to other types of telephones, including for example, land-line phones.

Wireless device 2 also has the capability of playing music or other secondary audio to a user. Again, secondary audio may comprise any of a wide variety of audio unrelated to the phone call audio, such as music, an audio book or recorded radio show, a news broadcast, an audio stock market ticker, audio associated with a video presentation, a workout recording, or the like. To play the secondary audio, device 2 includes an audio unit 8. Audio unit 8 may comprise an audio decoder that decodes digitally encoded music or the like, e.g., decodes MP3 files, AAC files, MIDI files, or any type of coded audio files. Audio unit 8 is not necessarily digital, however, and may process analog audio signals in some embodiments. Coded music (or other secondary audio) may be stored in a memory associated with audio unit 8, an external memory (not shown), or could be transmitted to device 2 as files or as streaming audio or a broadcast. In addition, in some embodiments, device 2 may be equipped to play video sequences, or support video telephony (VT) with another device. Accordingly, device 2 also may include a camera, and form a so-called camera phone or video phone that supports VT applications.

In still other cases, audio unit 8 may form the audio decoding portion of a video broadcast reception unit of device 2. In this case, audio unit 8 may deliver the audio associated with a broadcast channel to which device 2 is tuned. Such wireless broadcasting to device 2, for example, may comply with techniques or standards such as Forward Link Only (FLO), Digital Multimedia Broadcasting (DMB), and Digital Video Broadcasting—Handheld (DVB-H).

In accordance with this disclosure, and with reference to FIG. 1, device 2 includes an audio mixing unit 10. Audio mixing unit 10 is the component or process of device 2 that handles the mixing of two or more audio signals. Audio mixing unit 10 can mix the secondary audio of audio unit 8 with the telephone call audio of modem 6 to generate a mixed output signal. Drive circuit 12 uses the output signals from mixing unit 10 to generate drive signals that can drive speakers 14A and 14B and thereby generate audible sounds. Speakers 14 may comprise headphone speakers, floor standing speakers, speakers in a motorized vehicle, or generally, any type of speaker design. Drive circuit 12 may include an amplifier circuit and may be integrated with speakers 14 or may be a separate circuit.

If audio unit 8 is playing secondary audio, but modem 6 is not handling an incoming telephone call, audio mixing unit 10 simply forwards the musical output of audio unit 8 to drive circuit 12. Similarly, if modem 6 generates telephone call audio but audio unit 8 is not playing any secondary audio, audio mixing unit 10 simply forwards the telephone call audio drive circuit 12. Mixing techniques are used when audio unit 8 and modem 6 are both generating audio output that must be output together to the user. The telephone call audio may be monophonic or stereophonic, and similarly, the secondary audio may be monophonic or stereophonic. Typically, however, the telephone call audio is monophonic and the secondary audio is stereophonic.

Audio mixing unit 10 may operate according to a default priority scheme. If audio unit 8 is playing secondary audio but modem 6 is not handling an incoming telephone call, audio mixing unit 10 processes the secondary audio into a perceptual foreground. Similarly, if modem 6 generates telephone call audio but audio unit 8 is not playing any secondary audio, audio mixing unit 10 processes the telephone call into a perceptual foreground. When audio unit 8 and modem 6 are both generating audio, one of the audio signals is delivered in the perceptual foreground and the other is delivered in a perceptual background. Initially, the telephone call audio may be given priority over the secondary audio for delivery in the foreground.

Accordingly, upon reception of an incoming telephone call, audio mixing unit 10 may automatically grant initial priority to the telephone call audio. This means that audio mixing unit 10 moves any music or other secondary audio from audio unit 8 to the perceptual background and delivers the telephone call audio to drive circuit 12 in the perceptual foreground. If desired, audio mixing unit 10 may execute fading techniques in order to fade the secondary audio from the perceptual foreground to the perceptual background upon reception of an incoming telephone call. Of course, the techniques of this disclosure may also apply when a user starts playing music or other secondary audio during a telephone conversation, and then provides user input to switch the priority of the telephone call audio and secondary audio.

Audio mixing unit 10 may implement any of a wide variety of audio mixing techniques in order to define a first audio output as being in a perceptual foreground and a second audio output as being in a perceptual background. As one example, audio mixing unit 10 may apply head related transfer functions (HRTFs) to the first audio and the second audio in order to combine the first and second audio in a desired manner. HRTFs are commonly used to create perceptual changes by positioning audio signals into different three-dimensional (3D) spatial locations via filters.

As another example, audio mixing unit 10 may apply relatively simple scaling and filtering techniques the first audio and the second audio in order to combine the first and second audio in a desired manner. Scaling and filtering, for example, may allow for 3D spatial affects to be created for different audio signals in a manner that can simulate perceptual results to those created by HRTFs. In many cases, the audio in the foreground is delivered at a higher volume relative to the audio in the background, which can also affect user perception. Regardless of how mixing unit 10 creates the different perceptual effects on the two different audio outputs, the techniques of this disclosure can allow a user to change the relative perceptual positioning of the different audio signals, e.g., at the press of a button.

For this purpose, wireless device 2 includes a user input element 18. User input element 18 may comprise a button, a touchpad, a keypad, a touch screen, one or more hard keys or soft keys, one or more selectable items from an options menu, a unit to receive use voice activated commands, or any other element that can allow a user to make a selection In accordance with this disclosure, upon user actuation of input element 18 on wireless device 2, controller 16 changes the audio priorities of audio mixing unit 10. In particular, upon user actuation of input element 18, controller 16 causes audio mixing unit 10 to move the secondary audio of audio unit 8 back to the perceptual foreground and to move the telephone call audio from modem 6 to the perceptual background.

Accordingly, the user is given the ability to select and control which of the two audio signals is presented in the foreground and which is presented in the background. Device 2 can operate according to a default, which generally gives priority to the telephone call audio. At any time, however, the user can override the default settings by actuating user input element 18. In this manner, the user experience can be improved. Again, the techniques of this disclosure may be particularly useful when a user is placed on "hold" in a telephone conversation, in which case, the user may want to hear his or her music in the foreground while waiting on hold. The techniques may also be used during a conversation, e.g., if the user is disinterested in the conversation and prefers to listen to music in the foreground during the conversation.

Figure 2:
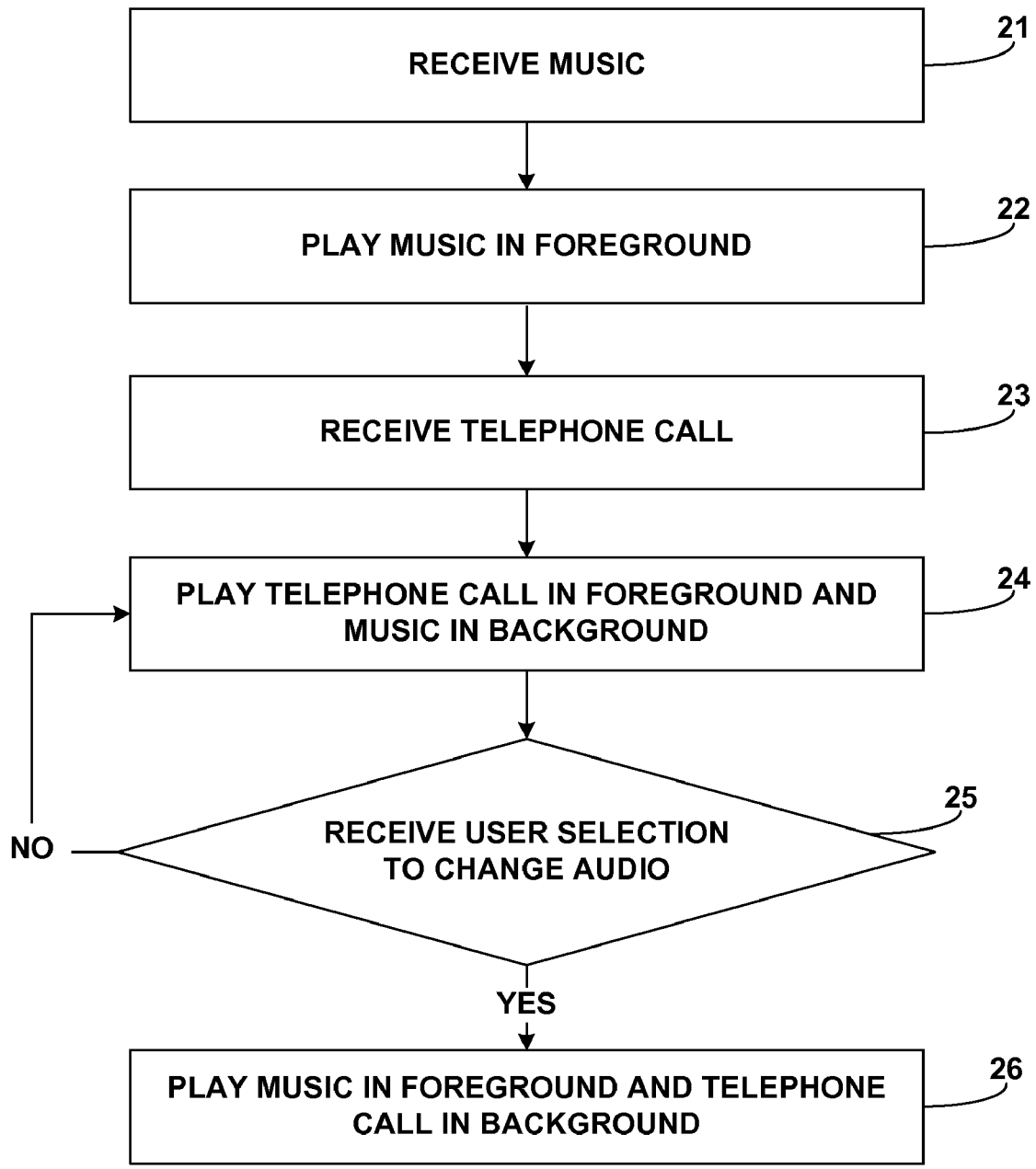
FIGS. 2 and 3 are flow diagrams illustrating techniques of this disclosure.

FIG. 2 is a flow diagram illustrating a technique of this disclosure. In the example of FIG. 2, the secondary audio is music. As shown in FIG. 2, audio mixing unit 10 of wireless device 2 receives music audio from audio unit 8 (21). Device 2 plays the music audio in a perceptual foreground (22). In particular, mixing unit 8 processes the music audio to deliver the music audio in a perceptual foreground, and provides output to drive circuit 12. Drive circuit 12 drives speakers 14A and 14B to play the music.

When mixing unit 10 receives telephone call audio from modem 6 (23), device 2 automatically plays the telephone call audio in the foreground and the music in the background (24). In particular, mixing unit 10 processes the telephone call audio and the music audio to deliver the telephone call audio in the perceptual foreground and the music in the perceptual background, and provides a combined output to drive circuit 12. Drive circuit 12 drives speakers 14A and 14B to play the combined output in which the telephone call audio is in the perceptual foreground and the music is in the perceptual background.

User input element 18 allows for a user to change the audio via a user selection. In particular, upon reception of a user selection to switch the audio (yes branch of 25), device 2 plays the music audio in the perceptual foreground and the telephone call audio in the perceptual background (25). In this case, control unit 16 causes mixing unit 10 to re-process the telephone call audio and the music audio to deliver the telephone call audio in the perceptual background and the music in the perceptual foreground. Mixing unit 10 provides a new combined output to drive circuit 12, and drive circuit 12 drives speakers 14A and 14B to play the new combined output in which the telephone call audio is in the perceptual background and the music is in the perceptual foreground. The user may toggle these perceptual positions of the music audio and telephone call audio with subsequent actuations of user input element 18.

Figure 3:
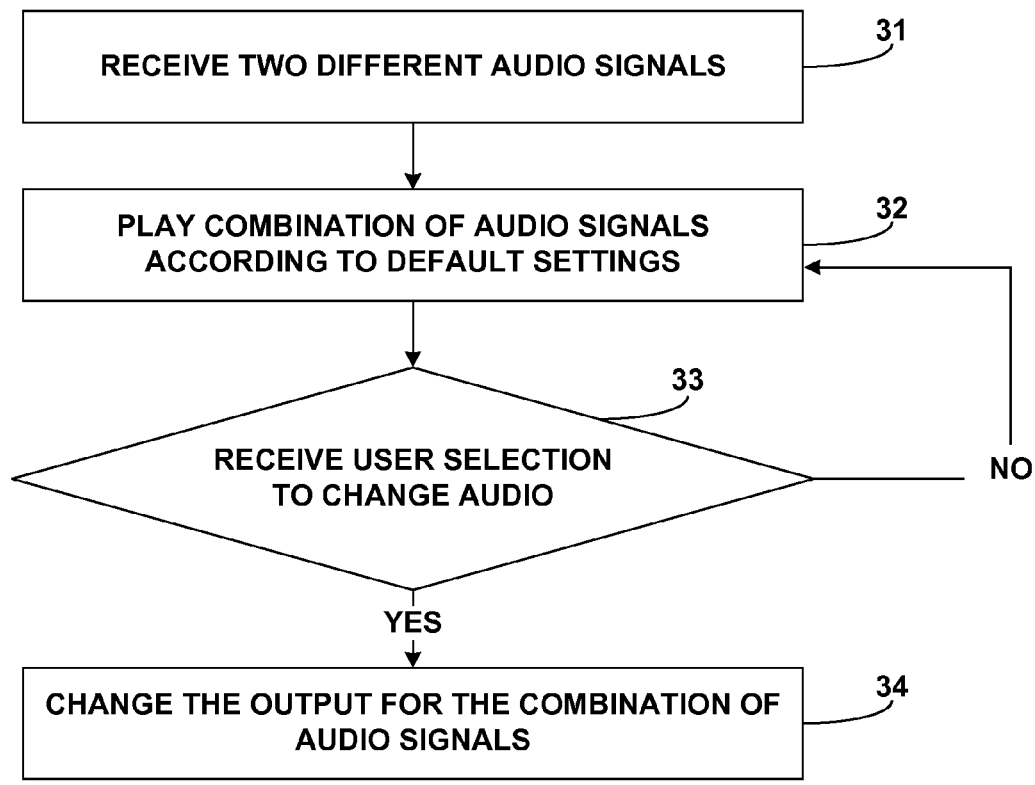

FIG. 3 is another flow diagram illustrating a technique of this disclosure. As shown in FIG. 3, audio mixing unit 10 of wireless device 2 receives two different audio signals (31). The two different audio signals may comprise secondary audio from audio unit 8 and telephone call audio from modem 6, although this disclosure is not limited to these two examples of audio signals. Device 2 then plays a combination of the two different audio signals according to default settings (32).

For example, the default settings may prioritize one of the audio signals over the other such that the first audio signal is played in a foreground (possibly at higher volume) while the second audio signal is played in a background (possibly at lower volume). The scenario of telephone call audio and secondary audio, where the telephone call audio is given default preference for the foreground is only one example. Again, the audio signals could be other types of audio signals and the default settings could be any type of settings in which the two audio signals are presented simultaneously, yet differently.

User input element 18 allows for a user to change the audio via a user selection. In particular, upon reception of a user selection to change the audio (yes branch of 33), device 2 changes the output for the combination of audio signals (34). In this case, control unit 16 causes mixing unit 10 to change the second audio signal to the foreground and the first audio signal to the background. In this manner, a user is given control over which of the two audio outputs are played in the background and which is played in the foreground.

The various techniques described herein may be implemented in hardware, software, firmware, or any combination thereof. If implemented in software, this disclosure may be directed to a computer readable medium comprising instructions, that when executed in a device causes the device to perform one or more of the audio mixing techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The instructions may be computer-readable instructions and a processor, such as a digital signal processor (DSP), may execute instructions stored in memory in order to carry out one or more of the audio mixing techniques described herein. In some cases, the techniques may be executed by a DSP that invokes various hardware components to accelerate the mixing process. In other cases, the units or modules described herein may be implemented as a microprocessor, one or more application specific integrated circuits (ASICs), one or more field programmable gate arrays (FPGAs), discrete logic circuitry, or some other hardware-software combination.

In some cases, the computer readable medium may itself be part of a computer program product, such as volatile memory or any type of non-volatile storage device. The computer program product may include packaging materials to package the computer readable medium for sale or distribution.

Nevertheless, various modifications may be made to the techniques described without departing from the scope of the following claims. For example, although many aspects of this disclosure have been described in which a music audio signal and a telephone call audio signal are mixed, this disclosure more generally contemplates the combination of any two audio signals in the manner described herein. The user is given the ability to change the default mixing of two audio signals in order to swap the different signals between a perceptual foreground and a perceptual background. Furthermore, the techniques of this disclosure may also apply when three or more audio signals are combined. The user has the ability switch or toggle the perceptual location of at least two of the audio signals. The specific examples described above and other examples are within the scope of the following claims.

The invention claimed is:

1. A method in a wireless device, the method comprising:
outputting music audio from the wireless device in a perceptual foreground;
receiving a new telephone call while outputting the music audio from the wireless device in the perceptual foreground;
moving the music audio from the perceptual foreground to a perceptual background in response to receiving the new telephone call;
generating, in the wireless device, a first combination of the music audio and audio from the new telephone call in response to receiving the new telephone call, wherein the first combination is such that the audio from the new telephone call is in the perceptual foreground and the music audio is in the perceptual background;
outputting the first combination from the wireless device while continuing to receive audio from the new telephone call;
in response to a user input, moving the music audio output to the perceptual foreground and moving the audio from the new telephone call to the perceptual background to form a second combination;

outputting the second combination from the wireless device while continuing to receive audio from the new telephone call;

automatically detecting that a user has come off of hold on the new telephone call; and moving the music audio output from the wireless device from the perceptual foreground to a perceptual background after automatically detecting that the user has come off of hold, wherein the method is performed in the wireless device.

2. The method of claim 1, further comprising:

receiving another user input to switch back from the second combination to the first combination; and in response to the another user input, generating and outputting the first combination.

3. The method of claim 1, the further comprising receiving the user input in response to an actuation of a user input element on the wireless device.

4. The method of claim 1, wherein the audio from the new telephone call comprises a portion of a video telephony communication with another device.

5. The method of claim 1, wherein the first combination includes new phone call audio in the perceptual foreground with a higher volume than the music audio in the perceptual background.

6. A wireless device configured to:

output music audio from the wireless device in a perceptual foreground;

receive a new telephone call while outputting the music audio from the wireless device in the perceptual foreground;

move the music audio output from the wireless device from the perceptual foreground to a perceptual background in response to receiving the new telephone call;

generate, in the wireless device, a first combination of the music audio and audio from the new telephone call in response to receiving the new telephone call, wherein the first combination is such that audio from the new telephone call is in the perceptual foreground and the music audio is in the perceptual background;

output the first combination from the wireless device while continuing to receive audio from the new telephone call;

in response to a user input, move the music audio output from the wireless device to the perceptual foreground and move the audio from the new telephone call to the perceptual background to form a second combination;

output the second combination from the wireless device while continuing to receive audio from the new telephone call;

automatically detect that a user has come off of hold on the new telephone call; and move the music audio output from the wireless device from the perceptual foreground to a perceptual background after automatically detecting that the user has come off of hold.

7. The wireless device of claim 6, wherein the wireless device is further configured to:

receive another user input to change back from second combination to the first combination; and in response to the another user input, generate and output the first combination.

8. The wireless device of claim 6, wherein the wireless device further includes a user input element, the user input element configured to generate the user input in response to an actuation.

9. The wireless device of claim 6, wherein the device is further configured to play video sequences.

10. The wireless device of claim 6, wherein the wireless device is further comprises a user input element to receive the user input, the user input element includes at least one of a keypad and a touch screen.

11. The wireless device of claim 6, wherein the wireless device is further configured to receive the user input via a voice command.

12. The wireless device of claim 6, wherein the wireless device is further configured to combine a third audio with the music audio and the audio from the new telephone call.

13. A tangible and non-transitory computer readable medium comprising instructions that upon execution cause a wireless device to perform the method of:

outputting music audio from the wireless device in a perceptual foreground;

receiving a new telephone call while outputting the music audio from the wireless device in the perceptual foreground;

moving the music audio output from the wireless device from the perceptual foreground to a perceptual background in response to receiving the new telephone call;

generating, in the wireless device, a first combination of the music audio and audio from the new telephone call in response to receiving the new telephone call, wherein the first combination is such that audio from the new telephone call is in the perceptual foreground and the music audio is in the perceptual background;

outputting the first combination from the wireless device while continuing to receive audio from the new telephone call;

in response to a user input, moving the music audio output from the wireless device to the perceptual foreground and moving the audio from the new telephone call to the perceptual background to form a second combination;

outputting the second combination from the wireless device while continuing to receive audio from the new telephone call;

automatically detecting that a user has come off of hold on the new telephone call; and moving the music audio output from the wireless device from the perceptual foreground to a perceptual background after automatically detecting that the user has come off of hold, wherein the method is performed in the wireless device.

14. The computer readable medium of claim 13, wherein the instructions, when executed, perform a method of receiving the user input in response to an actuation of a user input element on the wireless device.

15. The computer readable medium of claim 13, wherein the computer readable medium comprises at least one of random access memory and read-only memory.

16. The computer readable medium of claim 13, wherein generating the first combined audio comprises applying scaling and filtering techniques to the music audio and the audio from the new telephone call.

17. An apparatus comprising a wireless device, the wireless device comprising:

means for outputting music audio from the wireless device in a perceptual foreground;

means for receiving a new telephone call while outputting the music audio from the wireless device in the perceptual foreground;

means for moving the music audio output from the wireless device from the perceptual foreground to a perceptual background in response to receiving the new telephone call;

means for generating, in the wireless device, a first combination of the music audio and audio from the new telephone call in response to receiving the new telephone call, wherein the first combination is such that audio from the new telephone call is in the perceptual foreground and the music audio is in the perceptual background;

means for outputting the first combination from the wireless device while continuing to receive audio from the new telephone call;

means for moving, in response to a user input, the music audio output from the wireless device to the perceptual foreground and moving the audio from the new telephone call to the perceptual background to form a second combination;

means for outputting the second combination from the wireless device while continuing to receive audio from the new telephone call;

means for automatically detecting that a user has come off of hold on the new telephone call; and means for moving the music audio output from the wireless device from the perceptual foreground to a perceptual background after automatically detecting that the user has come off of hold.

18. The apparatus of claim 17, wherein the wireless device is a wireless radiotelephone.

19. The apparatus of claim 17, wherein the wireless device further comprises means for receiving another input from the user to change back from the second combination to the first combination.

20. The apparatus of claim 17, wherein the means for generating first combined audio is further configured to generate the first combined audio such that the audio from the new telephone call in the perceptual foreground has a higher volume than the music audio in the perceptual background.

21. The apparatus of claim 17, wherein the means for generating first combined audio is further configured to generate the first combined audio by applying head related transfer functions (HRTFs) to the music audio.

* * * * *